United States Patent
Huang et al.

(10) Patent No.: US 9,042,567 B2
(45) Date of Patent: May 26, 2015

(54) ACOUSTIC ECHO CANCELLATION SYSTEM

(71) Applicant: Quanta Computer Inc., Tao Yuan Shien (TW)

(72) Inventors: Kuo-Chun Huang, Tao Yuan Shien (TW); Kai-Ju Cheng, Taoyuan County (TW); Rong-Quen Chen, Taipei (TW); Shih-Hsiang Lo, Tao Yuan Shien (TW)

(73) Assignee: QUANTA COMPUTER INC., Tao Yuan Shien (TW)

( * ) Notice: Subject to any disclaimer, the term of this patent is extended or adjusted under 35 U.S.C. 154(b) by 312 days.

(21) Appl. No.: 13/845,071

(22) Filed: Mar. 17, 2013

(65) Prior Publication Data

US 2014/0146975 A1    May 29, 2014

(30) Foreign Application Priority Data

Nov. 29, 2012   (TW) .............................. 101144737 A

(51) Int. Cl.
  *H04B 3/20*     (2006.01)
  *H04B 1/38*     (2006.01)
  *H04M 9/08*     (2006.01)

(52) U.S. Cl.
  CPC ..................................... *H04M 9/082* (2013.01)

(58) Field of Classification Search
  USPC ...................... 381/66; 379/3, 406.01, 406.05; 455/570; 370/289
  See application file for complete search history.

(56) References Cited

U.S. PATENT DOCUMENTS

| | | | |
|---|---|---|---|
| 6,724,736 B1 * | 4/2004 | Azriel | 370/286 |
| 2008/0304653 A1 * | 12/2008 | Ghani et al. | 379/406.08 |
| 2011/0211037 A1 * | 9/2011 | Gygax et al. | 348/14.08 |
| 2013/0332155 A1 * | 12/2013 | Prakash et al. | 704/226 |

* cited by examiner

*Primary Examiner* — Paul S Kim
*Assistant Examiner* — Norman Yu
(74) *Attorney, Agent, or Firm* — Rabin & Berdo, P.C.

(57) ABSTRACT

An acoustic echo cancellation (AEC) system includes a remote device, for capturing a remote captured sound, a server coupled to the remote device, and a local device coupled to the server. The server transmits the remote captured sound from the remote device to the local device. The local device receives, stores and plays the remote captured sound as a local playback sound. An echo is generated from reflection of the local playback sound. The local device captures the echo and a local sound into a local captured sound, and transmits both the remote captured sound and the local captured sound to the server. The server performs AEC on the local captured sound by using the remote captured sound from the local device and transmits the AEC processed local captured sound to the remote device.

9 Claims, 1 Drawing Sheet

ACOUSTIC ECHO CANCELLATION SYSTEM

This application claims the benefit of Taiwan application Serial No. 101144737, filed Nov. 29, 2012, the subject matter of which is incorporated herein by reference.

TECHNICAL FIELD

The disclosure relates to an acoustic echo cancellation (AEC) system.

BACKGROUND

Echoes affect communication sound quality. In general, echoes include short echoes and long echoes. When a remote voice is played by a local speaker, sound waves sent from the local speaker may be directly transmitted to a microphone (i.e., short echoes), or may be first reflected indoors and then transmitted to a microphone (i.e., long echoes). When an echo is sent back from the local microphone to a remote end, communication quality is noticeably degraded to result in a disturbing communication.

SUMMARY

Embodiments of the disclosure are directed to an acoustic echo cancellation (AEC) system. AEC is performed according to a local sound signal (including an echo) received by a local device and a remote sound signal stored at the local device, so as to mitigate undesirable effects resulted by network transmission delays.

The embodiments of the disclosure are further directed to an AEC system. A remote device is not required to send a remote sound back to a server when AEC is performed, so as to reduce a data amount of network transmission.

According to an exemplary embodiment of the disclosure, an AEC system is provided. The AEC system includes: a remote device, for capturing a remote captured sound; a server, coupled to the remote device, for receiving the remote captured sound from the remote device; and a local device, coupled to the server, for receiving and storing the remote captured sound. The local device further receives, stores and plays the remote captured sound as a local playback sound. An echo is generated from reflection of the local playback sound. The local device captures the echo and a local sound into a local captured sound, and transmits both the remote captured sound and the local captured sound to the server. The server performs AEC on the local captured sound by using the the local captured sound from the local device and sends the AEC processed local captured sound to the remote device.

According to another exemplary embodiment of the disclosure, an AEC system is provided. The AEC system includes: a remote device, for capturing a remote captured sound; a server, coupled to the remote device; and a local device, coupled to the server. The server receives and stores the remote captured sound and a packet index information corresponding to the remote captured sound sent from the remote device, and transmits the remote captured sound and the corresponding packet index information to the local device. The local device stores the packet index information, and plays the remote captured sound as a local playback sound. An echo is generated from reflection of the local playback sound. The local device captures the echo and a local sound into a local captured sound. The local device sets the packet index information to the local captured sound, and transmits the local captured sound set with the packet index information to the server. The server compares the stored remote captured sound and the local captured sound sent from the local device based on the packet index information, performs AEC on the local captured sound, and sends the AEC processed local captured sound to the remote device.

The above and other contents of the application will become better understood with regard to the following detailed description of the preferred but non-limiting embodiments. The following description is made with reference to the accompanying drawings.

DETAILED DESCRIPTION OF THE APPLICATION

In the embodiments, in performing acoustic echo cancellation (AEC), a sound signal including an echo received by a local device is jointly sent back to a server with a remote sound signal temporarily stored at the local device, and the server then performs AEC. Thus, undesirable effects resulted by a transmission delay on the sound signal can be mitigated. It should be noted that, in the embodiments, neither the local device nor the remote device is required to perform AEC.

Figure 1:
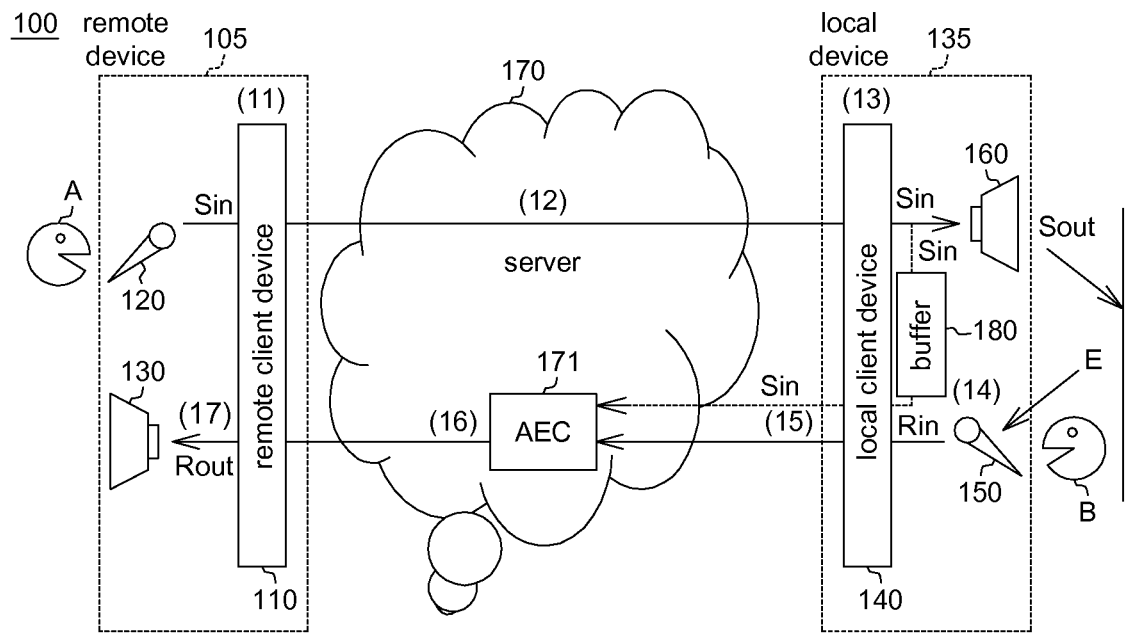
FIG. 1 is a schematic diagram of an AEC system according to one embodiment of the disclosure.

FIG. 1 shows a schematic diagram of an AEC system according to an embodiment of the disclosure. Referring to FIG. 1, an AEC system 100 includes a remote device 105, a local device 135 and a server 170. The remote device 105 includes a remote client device 110, a remote sound capturing device 120 and a remote sound playback device 130. The local device 135 includes a local client device 140, a local sound capturing device 150 and a local sound playback device 160. The server 170 includes an AEC unit 171. For example but not limited by, in the embodiment of the application, the sound capturing device is a microphone, and the sound playback device is a speaker. The remote device 105 and the local device 135 are respectively connected to the server 170 via the remote client device 110 and the local client device 140. In one embodiment, the client device may include a network module for transmitting digital information to the server 170 or receiving digital information from the server 170.

In FIG. 1, the remote client device 110, the remote sound capturing device 120 and the remote sound playback device 130 are independent devices. In an alternative embodiment, the remote client device 110, the remote sound capturing device 120 and the remote sound playback device 130 may be integrated to be one single device. Similarly, the local client device 140, the local sound capturing device 150 and the local sound playback device 160 may be independent devices or may be integrated.

For example, the remote sound capturing device 120 captures a remote captured sound Sin of a remote speaker A. This operation is denoted by a symbol (11) in FIG. 1. In one embodiment, the remote captured sound Sin in analog form is converted to digital form via the remote client device 110 or the remote sound capturing device 120. That is, the remote client device 110 or the remote sound capturing device 120 supports an analog-to-digital converter (ADC) function, and further transmits the signal in a digital form to the server 170.

The server 170 transmits the remote captured sound Sin (in a digital form) from the remote client device 110 to the local client device 140. This operation is denoted by a symbol (12)

in FIG. 1. In FIG. 1, the server 170, instead of temporarily storing the remote captured sound Sin sent from the remote client device 110, directly bypasses the remote captured sound Sin to the local client device 140.

The local client device 140 receives and stores the remote captured sound Sin from the server 170. This operation is denoted by a symbol (13) in FIG. 1.

The local client device 140 transmits the remote captured sound Sin (in a digital form) to the local sound playback device 160 for playing. The sound played by the local sound playback device 160 is a local playback sound Sout (in an analog form). An echo E is generated after the local playback sound Sout is reflected, and is received by the local sound capturing device 150. Besides, the local sound capturing device 150 further receives a sound of a local speaker B. An output signal of the local sound capturing device 150 is a local captured sound Rin. This operation is denoted by a symbol (14) in FIG. 1. That is to say, the local captured sound Rin includes the echo E and the sound of the local speaker B. In addition to playing the remote captured sound Sin, the local client device 140 further temporarily stores the remote captured sound Sin (in a digital form) to a built-in or external memory or a buffer 180.

In one embodiment, the remote captured sound Sin (symbol 13) in digital form is converted to analog form via the local client device 140 or the local sound playback device 160. That is to say, the local client device 140 or the local sound playback device 160 supports a digital-to-analog converter (DAC) function.

In one embodiment, the local captured sound Rin (the echo E and the sound of the speaker B) in analog form is converted to digital form via the local client device 140 or the local sound capturing device 150.

The local client device 140 further transmits both the stored remote captured sound Sin and the local captured sound Rin to the server 170. This operation is denoted by a symbol (15) in FIG. 1.

The AEC unit 171 of the server 170 performs AEC on the remote captured sound Sin and the local captured sound Rin. This operation is denoted by a symbol (16) in FIG. 1. For example, the server 170 may adopt any suitable technique of AEC algorithms for performing the AEC.

In this embodiment, the remote captured sound Sin (symbol 11) sent from the remote client device 110 is not temporarily stored in the server 170 but transmitted to the server 170 with the local captured sound Rin by the local client device 140 to the server 170. The purpose of the above is to prevent possible transmission delays in network transmission that lead to an incorrect AEC process performed by the AEC unit 171. More specifically, assume that the remote captured sound Sin (symbol 11) sent from the remote client device 110 is stored in the server 170, and the local client device 140 is required to only transmit the local captured sound Rin. In the occurrence of network transmission delays, due to receiving the local captured sound Rin continuously from the local client device 140, when the AEC unit 171 performs AEC on the local captured sound Rin by use of the stored remote captured sound Sin in the server 170, the AEC unit 171 is incapable of confirming to which of the local captured sounds Rin the echo E corresponding to the stored remote captured sound Sin belongs, i.e., the server 170 may fail to determine which one of the local captured sounds Rin having the echo E corresponding to the stored remote captured sound Sin, thus AEC may not be effectively performed.

Therefore, in this embodiment, regardless of whether network transmission delays are severe, AEC can still be effectively performed since AEC performed at the server 170 is carried according to the remote captured sound Sin (symbol 13) and the local captured sound Rin simultaneously transmitted by the local client device 140. Thus, the server 170 may directly compare the above signals to effectively cancel the echo E corresponding to the remote captured sound Sin.

The remote sound playback device 130 plays an AEC result sent from the server 170 as a remote playback sound Rout. This operation is denoted by a symbol (17) in FIG. 1. Therefore, sounds played by the remote sound playback device 130 are substantially without echo so that the remote user may clearly hear sounds coming from other side.

Figure 2:
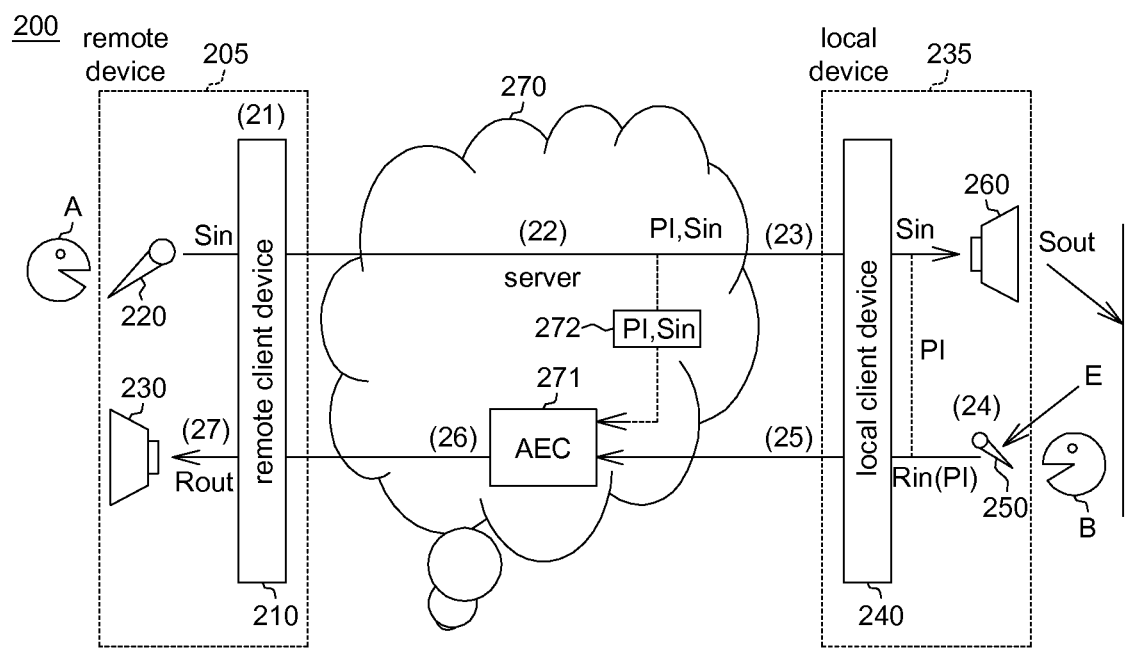
FIG. 2 is a schematic diagram of an AEC system according to another embodiment of the disclosure.

In an alternative embodiment, when performing AEC, the remote device is not required to send the remote sound signal back to the server, so that data traffic on network transmission is reduced. FIG. 2 shows a schematic diagram of an AEC system according to another embodiment of the disclosure. As shown in FIG. 2, an AEC system 200 includes a remote device 205, a local device 235 and a server 270. The remote device 205 includes a remote client device 210, a remote sound capturing device 220 and a remote sound playback device 230. The local device 235 includes a local client device 240, a local sound capturing device 250 and a local sound playback device 260. The server 270 includes an AEC unit 271. Operation differences between FIGS. 1 and 2 are described below. An operation (21) in FIG. 2 is substantially the same as the operation (11) in FIG. 1.

Different from FIG. 1, the server 270 stores the remote captured sound Sin (from symbol 21) and packet index information PI (e.g., a packet ID) corresponding to the remote captured sound Sin, as shown in an operation (22). More specifically, assume that the remote captured sound Sin is transmitted in a packet form, sound packets of the remote captured sound Sin respectively include corresponding packet index information (e.g., each sound packet corresponds to one packet index information).

Further, the server 270 transmits the remote captured sound Sin and the corresponding packet index information PI to the local client device 240, as shown by an operation (23). The server 270 stores the remote captured sound Sin and the corresponding packet index information PI in a memory (not shown) or a buffer 272.

An operation (24) in FIG. 2 is substantially the same as the operation (14) in FIG. 1. That is, the local sound capturing device 250 at the same time captures the echo E and the sound from a local speaker B to generate the local captured sound Rin. The remote captured sound Sin is played by the local sound playback device 260 as a local playback sound Sout (in analog form), and is reflected to generate the echo E. Further, as the local client device 240 also receives the packet index information PI corresponding to the remote captured sound Sin, the local client device 240 may set or dispatch the packet index information PI to the local captured sound Rin (i.e., setting and matching). The remote captured sound Rin set with the packet index information PI is then transmitted to the server 270. This operation is denoted by a symbol (25) in FIG. 2.

After receiving the local captured sound Rin (symbol 24) which the packet index information PI is set to, the server 270 compares all the packet index information temporarily stored in the memory 272, so as to find the same packet index information PI among the stored packet index information and identify the corresponding remote captured sound Sin (symbol 272) accordingly. Through the local captured sound Rin and the corresponding remote captured sound Sin, the server 270 performs AEC on the local captured sound Rin via the AEC unit 270 according to the remote captured sound Sin. This operation is denoted by a symbol (26) in FIG. 2.

The echo-removed local captured sound Rin is then transmitted to the remote client device 210 by the server 270 and played by the remote sound playback device 230. This operation is denoted by a symbol (27) in FIG. 2.

Compared to FIG. 1, in this embodiment, rather than transmitting the remote captured sound Sin, the local client device 240 is required to transmit the local captured sound Rin carrying the packet index information PI to the server 270. Therefore, the data amount on network transmission is reduced to lower network loading.

While the application has been described by way of example and in terms of the preferred embodiments, it is to be understood that the application is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An acoustic echo cancellation (AEC) system, comprising: a remote device, for capturing a remote captured sound; a server, coupled to the remote device, for receiving the remote captured sound from the remote device; and a local device, coupled to the server, for receiving and storing the remote captured sound from the server; wherein, the local device plays the remote captured sound as a local playback sound, an echo is generated from reflection of the local playback sound, the local device captures the echo and a local sound into a local captured sound, and the local device transmits the stored remote captured sound and the local captured sound to the server, and the server performs AEC on the local captured sound by using the remote captured sound from the local device and sends the AEC processed local captured sound to the remote device.

2. The AEC system according to claim 1, wherein the server does not store the remote captured sound sent from the remote device.

3. The AEC system according to claim 1, wherein each of the remote device and the local device comprise both a sound capturing device and a sound playback device.

4. The AEC system according to claim 3, wherein each of the remote device and the local device comprise a client device having a network module.

5. The AEC system according to claim 4, wherein each of the client devices comprises a digital-to-analog converter (DAC) and an analog-to-digital converter (ADC).

6. An acoustic echo cancellation (AEC) system, comprising:
a remote device, for capturing a remote captured sound;
a server, coupled to the remote device; and
a local device, coupled to the server;
wherein:
the server receives and stores the remote captured sound and a packet index information corresponding to the remote captured sound sent from the remote device, and transmits the remote captured sound and the corresponding packet index information to the local device;
the local device stores the packet index information and plays the remote captured sound as a local playback sound, an echo is generated from reflection of the local playback sound, and the local device captures the eco and a local sound into a local captured sound;
the local device sets the packet index information to the local captured sound, and transmits the local captured sound set with the packet index information to the server; and
the server compares the stored remote captured sound and the local captured sound from the local device based on the packet index information, performs AEC on the local captured sound, and transmits the AEC processed local captured sound to the remote device.

7. The AEC system according to claim 6, wherein each of the remote device and the local device comprise both a sound capturing device and a sound playback device.

8. The AEC system according to claim 7, wherein each of the remote device and the local device comprise a client device having a network module.

9. The AEC system according to claim 8, wherein each of the client devices comprise a DAC and an ADC.

* * * * *